(12) United States Patent
Antanies

(10) Patent No.: US 8,014,972 B1
(45) Date of Patent: Sep. 6, 2011

(54) COMPUTERIZED METHOD FOR CREATING A CUSUM CHART FOR DATA ANALYSIS

(76) Inventor: John Antanies, Phoenix, AZ (US)

( * ) Notice: Subject to any disclaimer, the term of this patent is extended or adjusted under 35 U.S.C. 154(b) by 17 days.

(21) Appl. No.: 12/489,284

(22) Filed: Jun. 22, 2009

Related U.S. Application Data

(60) Division of application No. 11/691,871, filed on Mar. 27, 2007, now Pat. No. 7,555,405, which is a continuation-in-part of application No. 10/954,082, filed on Sep. 30, 2004, now Pat. No. 7,283,928.

(51) Int. Cl.
*G06F 17/18* (2006.01)
(52) U.S. Cl. ........................................ 702/179
(58) Field of Classification Search .............. 702/128, 702/146, 147, 178–182; 700/52, 97, 108; 705/8, 10
See application file for complete search history.

(56) References Cited

U.S. PATENT DOCUMENTS

| | | | |
|---|---|---|---|
| 4,475,158 A | 10/1984 | Elias | |
| 5,546,516 A | 8/1996 | Austel et al. | |
| 5,694,524 A | 12/1997 | Evans | |
| 5,850,339 A | 12/1998 | Giles | |
| 6,098,063 A | 8/2000 | Xie et al. | |
| 6,110,109 A | 8/2000 | Hu et al. | |
| 6,507,832 B1 | 1/2003 | Evans et al. | |
| 6,539,392 B1 | 3/2003 | Rebane | |
| 6,687,558 B2 | 2/2004 | Tuszynski | |
| 2001/0041995 A1 | 11/2001 | Eder | |
| 2002/0091609 A1 | 7/2002 | Markowski | |
| 2002/0103688 A1 | 8/2002 | Schneider | |
| 2002/0152148 A1 | 10/2002 | Ebert | |
| 2003/0004903 A1 | 1/2003 | Kehder et al. | |
| 2003/0050048 A1 | 3/2003 | Abed et al. | |
| 2003/0050814 A1 | 3/2003 | Stoneking et al. | |
| 2004/0064353 A1 | 4/2004 | Kim et al. | |
| 2004/0122860 A1 | 6/2004 | Srinivasan | |
| 2005/0283337 A1* | 12/2005 | Sayal ............................ 702/179 |

* cited by examiner

*Primary Examiner* — Mohamed Charioui
(74) *Attorney, Agent, or Firm* — Booth Udall, PLC

(57) ABSTRACT

A method for evaluating the success of a manufacturing process that includes creating a CUSUM chart permitting a mathematical determination of when a step change in an industrial process has occurred.

4 Claims, 18 Drawing Sheets

| Vendor Tag | Start Date | End Date | Description | Normalized Breaks | PM6 Reel Speed P16ABB6 SY0.REE | PM16_SU CTN COUCH ROLL_HI VAC PM16_Bhy | PM16_MAIN STEAM DRYR FLOW PM16_Bhy | PM16_HD BX SLICE FLOW PM16_Bhy | PM16_1st TopFeltU hleBxSep TkOvrflw PM16_Bhy | PM16_2n dTopFelt UhleBx Overflow PM16_Bhy | PM16_2n dBoFeltU hleBx Overflow PM16_Bhy |
|---|---|---|---|---|---|---|---|---|---|---|---|
| | | | | 1 days | LSPD.value | P663-022 | F663-201 | F66-2-1948 | F663-035 | F663-051 | F663-057 |
| Kemira | 2/6/2005 7:00 | 2/17/2005 7:00 | BEFORE (4) | 3.56 | 3,330.89 | 20.84 | 85,882.81 | 17,547.68 | 410.85 | 1.85 | 28.11 |
| Kemira | 2/17/2005 7:00 | 2/21/2005 7:00 | BEFORE (4) | 3.72 | 3,173.28 | 21.07 | 91,744.83 | 17,173.69 | 412.51 | 3.82 | 28.22 |
| Kemira | 2/21/2005 7:00 | 2/25/2005 7:00 | BEFORE (4) | 0.75 | 3,404.29 | 20.71 | 80,903.88 | 17,175.05 | 412.56 | 2.72 | 28.22 |
| Kemira | 2/25/2005 7:00 | 3/11/2005 7:00 | BEFORE (4) | 3.11 | 3,508.33 | 20.18 | 91,998.66 | 18,342.40 | 328.12 | 1.79 | 28.22 |
| Kemira | 3/11/2005 7:00 | 3/15/2005 7:00 | BEFORE (4) | 2.33 | 3,416.74 | 20.12 | 91,551.88 | 18,537.69 | 300.10 | 1.29 | 28.22 |
| Kemira | 3/15/2005 7:00 | 3/19/2005 7:00 | BEFORE (4) | 4.05 | 3,579.47 | 20.58 | 102,526.64 | 18,594.70 | 299.75 | 1.59 | 28.22 |
| Kemira | 3/19/2005 7:00 | 4/2/2005 7:00 | BEFORE (4) | 1.97 | 3,412.69 | 21.07 | 98,334.24 | 18,162.52 | 331.33 | 2.29 | 28.22 |
| Kemira | 4/2/2005 7:00 | 4/14/2005 7:00 | BEFORE (4) | 2.27 | 3,627.32 | 21.23 | 98,320.02 | 18,262.12 | 364.54 | 3.31 | 28.21 |
| Kemira | 4/14/2005 7:00 | 4/18/2005 7:00 | BEFORE (4) | 1.00 | 3,725.51 | 20.59 | 89,523.78 | 18,342.21 | 361.48 | 2.89 | 28.22 |
| Kemira | 4/18/2005 7:00 | 4/28/2005 7:00 | BEFORE (4) | 3.64 | 3,514.09 | 20.44 | 91,847.18 | 18,968.60 | 354.83 | 3.55 | 28.22 |
| Kemira | 4/28/2005 7:00 | 5/8/2005 7:00 | BEFORE (4) | 2.28 | 3,811.74 | 20.71 | 96,129.66 | 19,088.64 | 357.73 | 4.72 | 28.22 |
| Kemira | 5/8/2005 7:00 | 5/16/2005 7:00 | BEFORE (4) | 3.00 | 3,839.21 | 20.57 | 97,539.38 | 19,490.17 | 353.92 | 5.46 | 28.22 |
| Kemira | 5/16/2005 7:00 | 5/26/2005 7:00 | BEFORE (4) | 4.02 | 3,695.37 | 20.46 | 93,504.36 | 19,277.44 | 352.39 | 3.12 | 28.22 |
| Kemira | 5/26/2005 7:00 | 6/8/2005 7:00 | BEFORE (4) | 1.27 | 3,343.15 | 20.26 | 89,496.22 | 18,361.26 | 336.84 | 3.87 | 27.16 |
| Kemira | 6/8/2005 7:00 | 6/21/2005 7:00 | BEFORE (4) | 3.19 | 3,263.36 | 20.15 | 93,840.11 | 17,895.89 | 327.72 | 4.62 | 28.21 |
| Kemira | 6/21/2005 7:00 | 6/25/2005 7:00 | BEFORE (4) | 3.89 | 3,633.64 | 19.71 | 89,068.60 | 18,907.12 | 353.20 | 4.14 | 28.22 |
| Kemira | 6/25/2005 7:00 | 7/8/2005 7:00 | BEFORE (4) | 2.55 | 3,609.84 | 19.84 | 94,011.56 | 18,515.60 | 353.25 | 3.46 | 28.22 |
| Kemira | 7/8/2005 7:00 | 7/13/2005 7:00 | BEFORE (4) | 4.31 | 3,606.07 | 19.68 | 92,914.13 | 18,958.83 | 355.57 | 4.46 | 28.22 |
| Kemira | 7/13/2005 7:00 | 7/25/2005 7:00 | BEFORE (4) | 2.84 | 3,575.64 | 19.94 | 99,366.48 | 18,798.98 | 407.47 | 571.00 | 28.21 |
| Kemira | 7/25/2005 7:00 | 8/4/2005 7:00 | BEFORE (4) | 2.87 | 3,512.44 | 19.68 | 91,580.62 | 18,109.89 | 407.55 | 3.92 | 28.22 |
| Kemira | 8/4/2005 7:00 | 8/17/2005 7:00 | BEFORE (4) | 3.28 | 3,478.47 | 20.35 | 94,158.68 | 18,805.12 | 407.42 | 3.20 | 28.22 |
| Kemira | 8/17/2005 7:00 | 8/23/2005 7:00 | BEFORE (4) | 2.36 | 3,675.11 | 19.86 | 90,217.63 | 18,821.80 | 21.57 | 14.73 | 16.64 |
| Kemira | 8/23/2005 7:00 | 9/6/2005 7:00 | BEFORE (4) | 1.79 | 3,613.87 | 19.91 | 94,116.21 | 18,651.11 | 119.90 | 16.03 | 16.64 |
| Kemira | 9/6/2005 7:00 | 9/18/2005 7:00 | BEFORE (4) | 2.13 | 3,687.09 | 19.76 | 88,980.87 | 18,583.45 | 99.41 | 17.52 | 16.66 |
| Kemira | 9/18/2005 7:00 | 9/22/2005 7:00 | BEFORE (4) | 0.84 | 3,720.70 | 19.64 | 92,037.58 | 18,661.86 | 91.82 | 18.39 | 16.66 |
| Kemira | 9/22/2005 7:00 | 10/6/2005 7:00 | BEFORE (4) | 0.50 | 3,729.51 | 20.05 | 87,919.00 | 18,785.19 | 76.09 | 25.08 | 16.66 |
| Kemira | 10/6/2005 7:00 | 10/21/2005 7:00 | BEFORE (4) | 1.90 | 3,630.00 | 20.34 | 96,904.38 | 18,473.57 | 83.76 | 21.51 | 16.66 |
| Kemira | 10/21/2005 7:00 | 10/25/2005 7:00 | BEFORE (4) | 3.01 | 3,405.56 | 20.62 | 94,439.56 | 17,370.02 | 124.06 | 20.52 | 16.66 |
| Kemira | 10/25/2005 7:00 | 10/29/2005 7:00 | BEFORE (4) | 2.56 | 3,354.34 | 20.81 | 92,415.08 | 16,841.06 | 98.87 | 19.73 | 16.66 |
| Kemira | 10/29/2005 7:00 | 11/02/2005 7:00 | BEFORE (4) | 2.47 | 3,142.04 | 20.88 | 99,885.63 | 17,266.23 | 88.08 | 23.75 | 16.66 |
| Kemira | 11/2/2005 7:00 | 11/6/2005 7:00 | BEFORE (4) | 0.57 | 2,327.55 | 21.56 | 107,095.47 | 15,678.78 | 60.65 | 30.05 | 16.66 |
| Kemira | 11/6/2005 7:00 | 11/10/2005 7:00 | BEFORE (4) | 1.62 | 2,913.82 | 21.00 | 105,584.08 | 16,208.90 | 79.82 | 28.76 | 16.64 |
| Kemira | 11/10/2005 7:00 | 11/14/2005 7:00 | BEFORE (4) | 3.84 | 3,406.37 | 19.37 | 88,133.15 | 17,807.06 | 81.69 | 24.37 | 16.66 |

FROM FIGURE 10

FIG. 10A

| | Normalized Breaks 1 Days | PM6 Reel Speed | CTN COUCH ROLL HI VAC | MAIN STEAM DRYER FLOW | HD BX SLICE FLOW | 1st Top Felt Uhle Bx Sep Tk Ovrflw | 2nd Top Felt Uhle Bx OverFlw | 2nd Bot Felt Uhle Bx Overflw |
|---|---|---|---|---|---|---|---|---|
| Deformer Trial (4) | (4.06) | 3,804.58 | 18.45 | 89,843.30 | 18,199.85 | 89.05 | 54.68 | 0.00 |
| Average All | 2.58 | 3,534.49 | 20.03 | 91,763.08 | 18,080.93 | 184.75 | 39.76 | 13.99 |
| Ranking (percent of population lower than trial) | (89%) | 97% | 2% | 32% | 50% | 26% | 65% | 0% |
| Probability the difference is meaningful | 87% | 85% | 98% | 64% | 56% | 77% | 66% | 87% |

Enclosed Numbers are discrete event counts; in this case, good = 1

Numbers are the values for the production trigger using the supplied filter criteria

| 7/28/2006 7:00 / 7/28/2006 3:00 | 7/27/2006 23:00 / 7/27/2006 19:00 | 7/27/2006 19:00 / 7/27/2006 15:00 | 7/27/2006 7:00 / 7/27/2006 3:00 |
|---|---|---|---|
| 3 | 2 | 1 | 1 |
| 1 | 1 | 0 | 1 |
| 1 | 1 | 1 | 1 |
| 0 | 0 | 1 | 1 |
| 1 | 1 | 1 | 1 |
| 1 | 0 | 1 | 0 |
| 1 | 0 | 1 | 1 |
| 0 | 1 | 1 | 1 |
| 1 | 1 | 0 | 0 |
| 0 | 1 | 1 | 1 |
| 1 | 1 | 1 | 1 |
| 1 | 1 | 1 | 1 |

COMPUTERIZED METHOD FOR CREATING A CUSUM CHART FOR DATA ANALYSIS

CROSS-REFERENCE TO RELATED PATENT APPLICATIONS

This is a divisional of application Ser. No. 11/691,871, filed Mar. 27, 2007, now pending, which was a continuation-in-part of application Ser. No. 10/954,082, now U.S. Pat. No. 7,283,928, issued Oct. 16, 2007, the disclosures of which are hereby incorporated entirely herein by reference.

BACKGROUND OF THE INVENTION

1. Technical Field of the Invention

The present invention relates, generally, to a computerized method for creating a CUSUM chart for data analysis as well as a unique method to evaluate trials in a manufacturing process that uses data historians.

More particularly, the present invention relates to a computerized method for creating a CUSUM chart, wherein: (a) one dependent variable CUSUM appears with one or more independent variables; (b) the method for determining which, if any, variables in a list take step changes on a pre-selected period of time used for measurement (e.g., one day or one hour) during the same pre-selected period of time that a dependent variable takes a step change; (c) the method overlaps a CUSUM chart for counting discrete events, such as breaks on a paper-machine against CUSUM charts of other process variables; or a continuous dependent variable such as overall efficiency and (d) the method mathematically determines when a step change has occurred on a CUSUM chart and then automatically identifies what other variable had the same step change date or time.

2. Description of the Prior Art

Industrial and manufacturing processes often employ a complex series of manufacturing steps, applied to one or more raw materials, to produce a product. A business goal is, generally, to maximize the process productivity by eliminating unscheduled downtime of the process, while maintaining a quality standard of the product. Machine processes are typically instrumented, employing a variety of sensors in communication with a computer system to measure and record various parameters relating to raw materials, the process itself, and the product. The data collected is useful to monitor equipment operation for consistency, and to track quality of both raw material and finished product. Additionally, faults that lead to costly production line downtime can be recorded.

Various methods have been employed to analyze data gathered relating to an industrial process for the purpose of identifying problem causation. Typically, known instrumentation and data recording systems gather a large amount of data, and then make the data available to commercial computer spreadsheet programs for treatment by standalone statistical analysis applications.

One particularly useful method for analysis of problem causation in industrial processes, such as, for example, in the chemical industry, where many suppliers sell chemicals and other consumables and often run trials to assess how well a chemical or consumable has performed, is a use of a CUSUM chart. A CUSUM chart is a type of control chart and "CUSUM" stands for "cumulative sum control chart. CUSUM charts used to detect small changes between 0-0.5 sigma. For larger shifts (0.5-2.5), Shewart-type charts are generally used. CUSUM charts plot the cumulative sum of the deviations between each data point (a sample average) and a reference value, historically designated by "T."

Unlike other control charts, one studying a CUSUM chart will be concerned with the slope of the plotted line, not just the distance between plotted points and the centerline. Critical limits for a CUSUM chart are not fixed or parallel and a mask in the shape of a "V" is usually laid over the chart with the origin over the last plotted point. Previous points covered by the mask indicate the process has shifted.

A CUSUM chart is, therefore, a proven statistical method to detect shifts in process data and created by entering data into an application after it is filtered for operational constraints and then calculating the numbers used to create the chart.

Historically, creating a CUSUM chart is simple:

Calculate the average of the variable of interest; call this "AVG";

Take the first observation and subtract the average (AVG). Call this "A"; and,

Next, take the second observation and subtract the average (AVG) and to this add "A". Repeat this calculation for each variable until you reach the last one. The value of "A" will now be 0.

An example of calculations for developing a CUSUM chart, as known to the prior art, is seen in FIG. 8. An example of a CUSUM chart is seen in FIG. 9. The CUSUM chart of hole counts on a paper machine (FIG. 9), which graphically illustrates that hole counts peaked on Oct. 27, 2005, and have since been below average.

The statistical techniques used by the prior art to create CUSUM charts are not based on parametric statistics, thereby requiring certain assumptions to be made initially to produce usable results. Such assumptions are often ignored, leading to compromised results. Most tools using a parametric method employ regression-based analysis, often leading to a problem of causation versus correlation.

In the paper industry, in particular, there is no rational method for counting sheet breaks on a paper machine using historical data based on criteria such as break duration, grade or product, time since the last break, etc.

Further, there is a need to be able to count breaks on a paper machine ex-poste facto based on certain criteria, creating a CUSUM chart, and then determining what other variables changed at the same time. There is also a need to analyze the mathematics behind a CUSUM chart in a variety of industrial processes without necessarily forcing a user to examine charts. For example, one can calculate the mathematical minimum of a CUSUM chart (the point at which the cumulative average was the lowest) and then mine data from data historians to automatically determine what other variables had either a minimum or maximum CUSUM value at the same time.

Consequently, there is a need for an automated process for mining data accumulated from a computerized data historian that monitors a manufacturing process, and analyzes the data to determine factors in the manufacturing process that need to be altered in order to improve the efficiency of the manufacturing process. Thus, a computerized method for creating and analyzing CUSUM charts is desired.

SUMMARY OF THE INVENTION

It is, therefore, an object of the present invention to provide a computerized method for creating a CUSUM chart for data analysis, which allows for ready determination of changes in an on-going manufacturing, or other industrial, process.

It is a further object of the present invention to provide a computerized method for creating a CUSUM chart that allows for a mathematical determination of when a step change in a manufacturing, or industrial, process has occurred, as indicated by the CUSUM chart, and to then readily identify what additional variables in the studied process had the same step change date or time.

The foregoing and related objects are accomplished by the present invention, which provides a computerized method for creating a CUSUM chart that allows for a mathematical determination of when a step change in a manufacturing, or industrial, process has occurred, as indicated by the CUSUM chart, and to then readily identify what additional variables in the studied process had the same step change date or time, which process includes the steps:

a. Identifying the production trigger and associated constraints. For example, the production trigger could be a break detector and the constraints a process vacuum that indicates the machine is running
b. Identifying the sample frequency for the production trigger
c. Identifying the time slice to be used to "dissect" the process data historian
d. Calculating the length of the data array as a function of the sampling frequency and the size of the time slice
e. Identifying the minimum samples within an array that meet the constraints specified in (a) above
f. Identifying all time slices that meet the criteria based on (a) through (e) above. This is referred to as the "Time Window."
g. Calculating the value of the dependent variable for each identified time slice
   (1) If the dependent variable is breaks on a paper machine, then the count is calculated using the techniques described in this submission
   (2) For all other dependent variables, the dependent variable is calculated by the average of all sampled observations in each time slice
h. Calculating a CUSUM chart for the dependent variable and displaying it to the user, to include the dates the dependent variable took step changes as well as the dates of best and worst performance, based on the slope of the CUSUM line as well as its inflection points and writing these inflection points to a table.
i. Identifying all independent variables to be analyzed
j. Identifying all time periods to be analyzed on a discrete basis. This would include, but is not limited to:
   (1) Trials of vendor products such as defoamer, retention aids, catalysts, etc.;
   (2) Installation dates of mechanical equipment such as press rolls, orifice plates, grinder plates, etc.;
   (3) Consumables supplied by vendors such as fabrics used on paper machines; and,
   (4) Dates where feedstocks changed such as crude suppliers in an oil refinery.
k. Calculating the number of time slices in each of the discrete times specified in (j) within the Time Window specified in (f) above.
l. Running the application using a recursive looping method such that for each independent variable specified in (i) above:
   (1) The average and coefficient of variation (COV) for each time slice is calculated;
   (2) A quartile chart (described in detail later) for both the average and COV of the independent variable is created, showing the value of the dependent variable for each quartile, thereby showing if there is any statistical relationship between the dependent and independent variables;
   (3) A CUSUM chart for the independent variable is created and then overlayed on the CUSUM chart of the dependent variable; and,
   (4) The inflection points of the independent variable's CUSUM chart is calculated and written to the table specified in (h) above.

The selected time slices may be "one day," "one hour" or any set period of time in which certain filter criteria are known to be true or correct. The filter criteria could be, for example, speed, product/grade, temperature, etc.

Once the CUSUM chart is produced, it may be mathematically determined when a step change has occurred in the manufacturing process, by observing the CUSUM chart, and then readily identifying which other variables had the same step change on the same date or other time interval. This essentially involves creating a list of variables that change on the same date as the studied independent variable and overlaying CUSUM charts.

The computerized method and software for data analysis is a computerized method, which may be used for identifying a causal relationship between at least one independent variable and a dependent variable in a set of data representing historical operating parameters of an industrial process.

Data representing historical operating parameters of an industrial process is input into a computer system. A dependent variable is identified within the set of data is identified, the dependent variable representing a fault or other condition within the industrial process. Additionally, at least one independent variable is identified within the set of collected data. A plurality of data sampling periods, such as days of operation, are identified for organization of the data. Dependent variable data and independent variable data are collected from the set of data for each of the data sampling periods.

Once the data has been gathered for each of the data sampling periods, independent variable data is used to organize the data sampling periods into distribution sets. For each independent variable, distribution breakpoints are determined to define distribution sets of the data sampling periods. For example, the data sampling periods may be ranked into quartile distribution sets by defining at least three distribution breakpoints separating the quartile distribution sets.

For each of the independent variables, once the distribution sets have been arranged into distribution quartiles, average values are calculated for the dependent variable data and the independent variable data. A graph is then generated to relate the dependent variable data to the independent variable data, the graph visually presenting the data to aid in determining a causal relationship between at least one of the independent variables and the fault or other condition.

The present invention provides for the following:

1. A method for counting breaks on a paper machine based on a set of criteria about the product, break length, etc. and using this method to determine what time slices fit certain manufacturing criteria (for example, all days on grade XYZ with one break or less);

2. A method for creating a CUSUM chart based on the calculation in Item #1, and identifying what other variables changed at the same time. The method includes using mathematical techniques to identify any variable that changed on the dates of interest; and, 3. A method for evaluating a trial by first identifying all production time slices that meet certain criteria (on a papermachine this would be breaks; in other manufacturing processes it would be done through the use of a production trigger), determining which time slices "fit" inside the dates of the trial, counting the slices that "fit", and then grouping all of the qualifying slices into blocks of time slices of equal count. Finally, calculating the values of all dependent and independent variables for each block of time (to include the trial) and then "ranking" the trial block against all other trial periods using a statistical ranking as well as parametric methods such as ANOVA.

Although the invention is conceived for the paper industry, it is intended for any manufacturing process such as oil refining.

Other objects and features of the present invention will become apparent when considered in view of the following detailed description of the invention, which provides certain preferred embodiments and examples of the present invention.

It should, however, be noted that the accompanying detailed description is intended to discuss and explain only certain embodiments of the claimed invention and is not intended as a means for defining the limits and scope of the invention.

BRIEF DESCRIPTION OF THE DRAWING FIGURES

In the drawing, wherein similar reference numerals denote similar features throughout the several views:

FIGS. 10 and 10A illustrate a chart of data results.

FIG. 11 illustrates a summarization of trial block data.

FIG. 12 illustrates an array of data.

DETAILED DESCRIPTION OF THE DRAWING FIGURES AND PREFERRED EMBODIMENTS

Figure 1A:
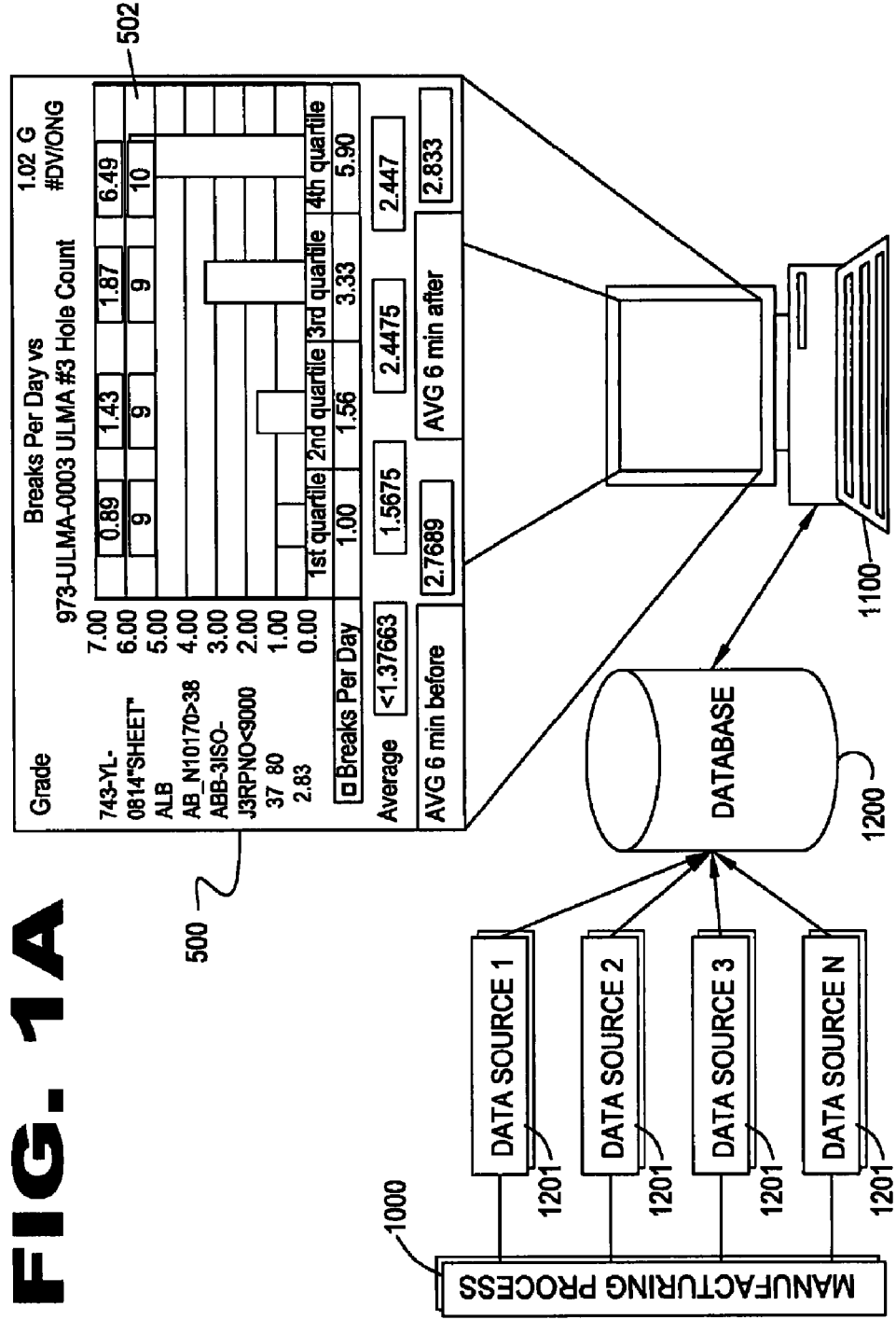
FIG. 1A is a block diagram of a computer system employing a computer program to perform a computerized method for data analysis according to the present invention.

The present invention computerized method and software for data analysis provides a computerized method for identifying a causal relationship between at least one independent variable and a dependent variable in a set of data representing historical operating parameters of an industrial process, and software for carrying out the method. Referring to FIG. 1A, the computerized method and software for data analysis is executed on a computer 1100, such as a typical personal computer or the like. The computer 1100 accesses data from a database 1200, including data obtained from at least one data source 1201 in communication with an industrial or manufacturing process 1000. Various methods of automating manufacturing equipment, and recording historical data derived from a manufacturing process 1000, are well known to those skilled in the art. Database 1200 thus contains a set of data representing historical operating parameters of an industrial process. Note that the database 1200 may be maintained within the computer 1100, or may be a separately maintained database, such as a database server accessed on a computer network.

The computerized method for data analysis involves inputting selected data from the database 1200 into the computer 1100. The selected data is organized into sample sets, such as all data samples collected in a single day. The selected data includes, within each sample set, at least one independent variable and one dependent variable, wherein the dependent variable is typically chosen to represent a fault condition, or a quality measure, production rate, speed, etc., within the manufacturing process 1000.

The sample sets are arranged, according to an independent variable, into distribution sets. In the illustrated embodiment, the distribution sets are quartile sets, although the present invention is not limited to quartile distribution sets. The distribution sets are used to generate a graph displayed on the computer 1100 that relates independent variable data to the dependent variable, illustrating a correlation between the independent and dependent variables to aid in determining a cause and effect relationship.

Figure 1B:
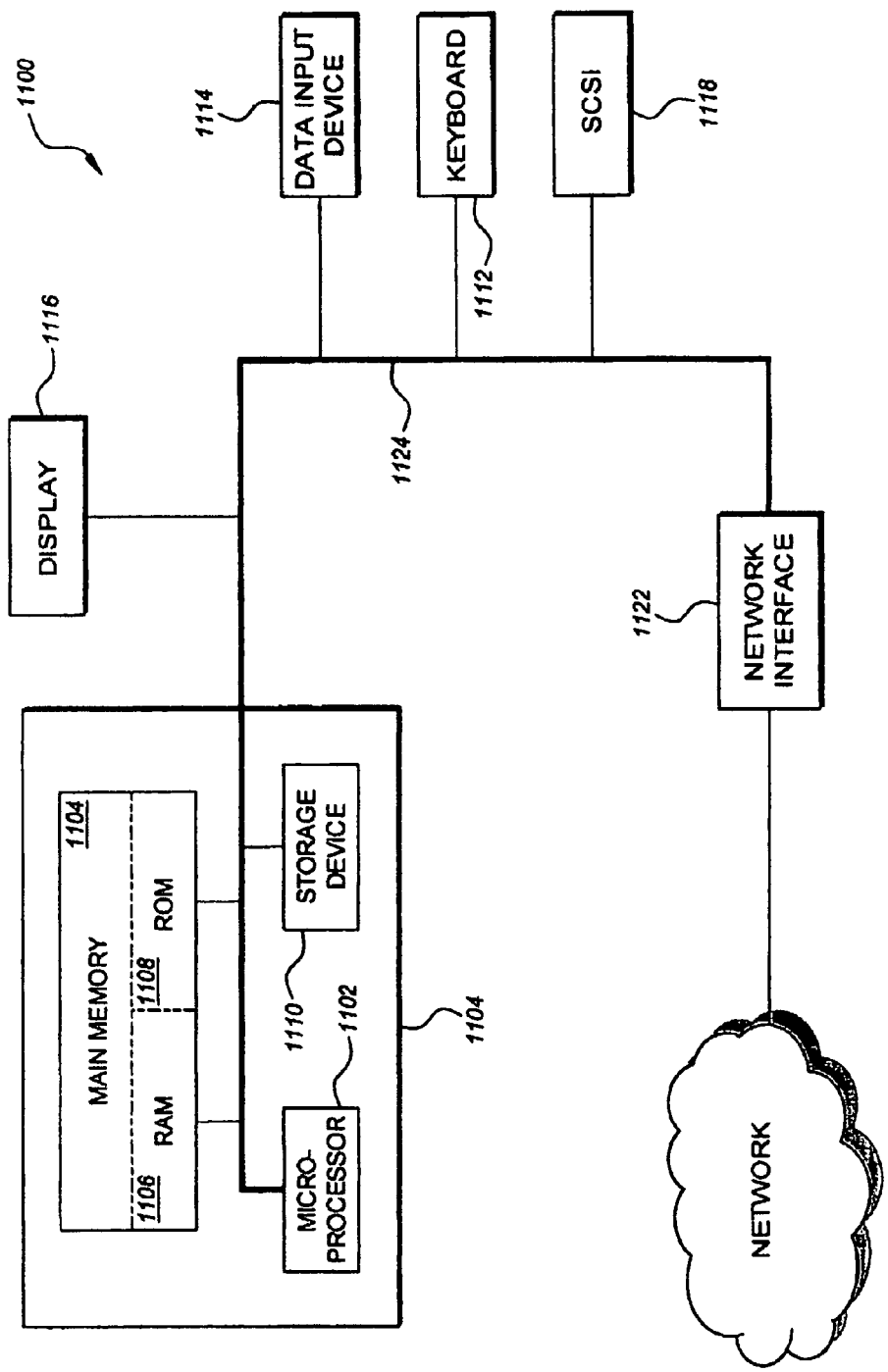
FIG. 1B is a block diagram of a computer system in which software for data analysis operates according to the computerized method for data analysis.

The computerized method and software for data analysis comprises a computerized method for data analysis implemented by software executing on a computer 1100. Referring to FIG. 1B, the computer 1100 is a general purpose or personal computer of a generally known and common configuration. Such a computer has a microprocessor 1102 connected by a bus 1124 to an area of main memory 1104, comprising both read only memory (ROM) 1108, and random access memory (RAM) 1106, and a storage device 1110 having means for reading a coded set of program instructions on a computer readable medium which may be loaded into main memory 1104 and executed by the microprocessor 1102. The computer 1100 has a display device 1116, a keyboard 1112, and may include other input devices 1114 such as automating devices in communication with the manufacturing process 1000, a mouse, joystick, etc. A network communication interface 1122 is provided for serial communications on a network or other serial communications link. Additionally, the computer 1100 may include a Small Computer System Interface (SCSI) adapter 1118 for communication with peripheral devices, including data sources 1201 such as automating devices in communication with the manufacturing process 1000.

Figure 2A:
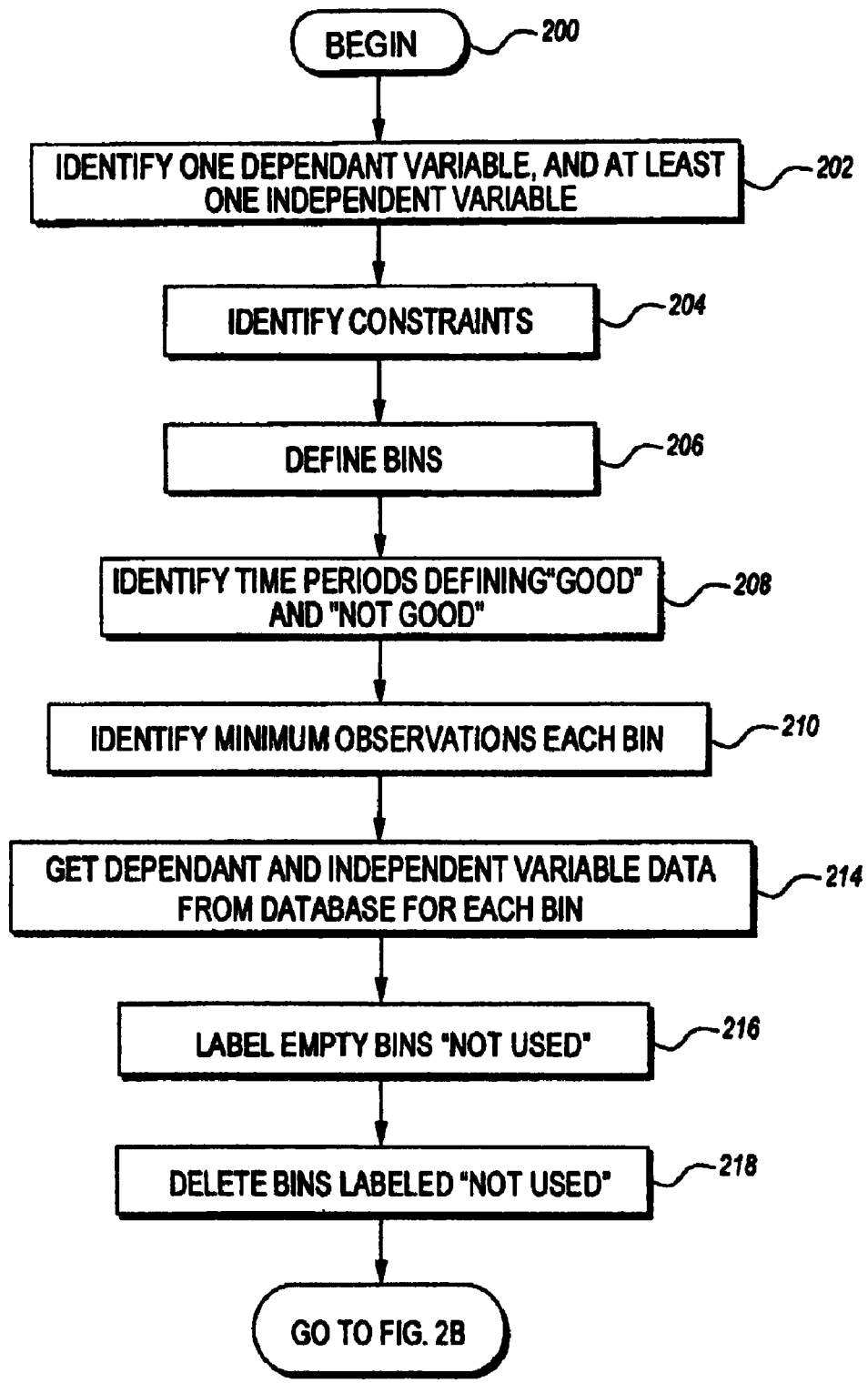
FIGS. 2A and 2B are a flow chart of a computerized method for data analysis according to the present invention.
Figure 2B:
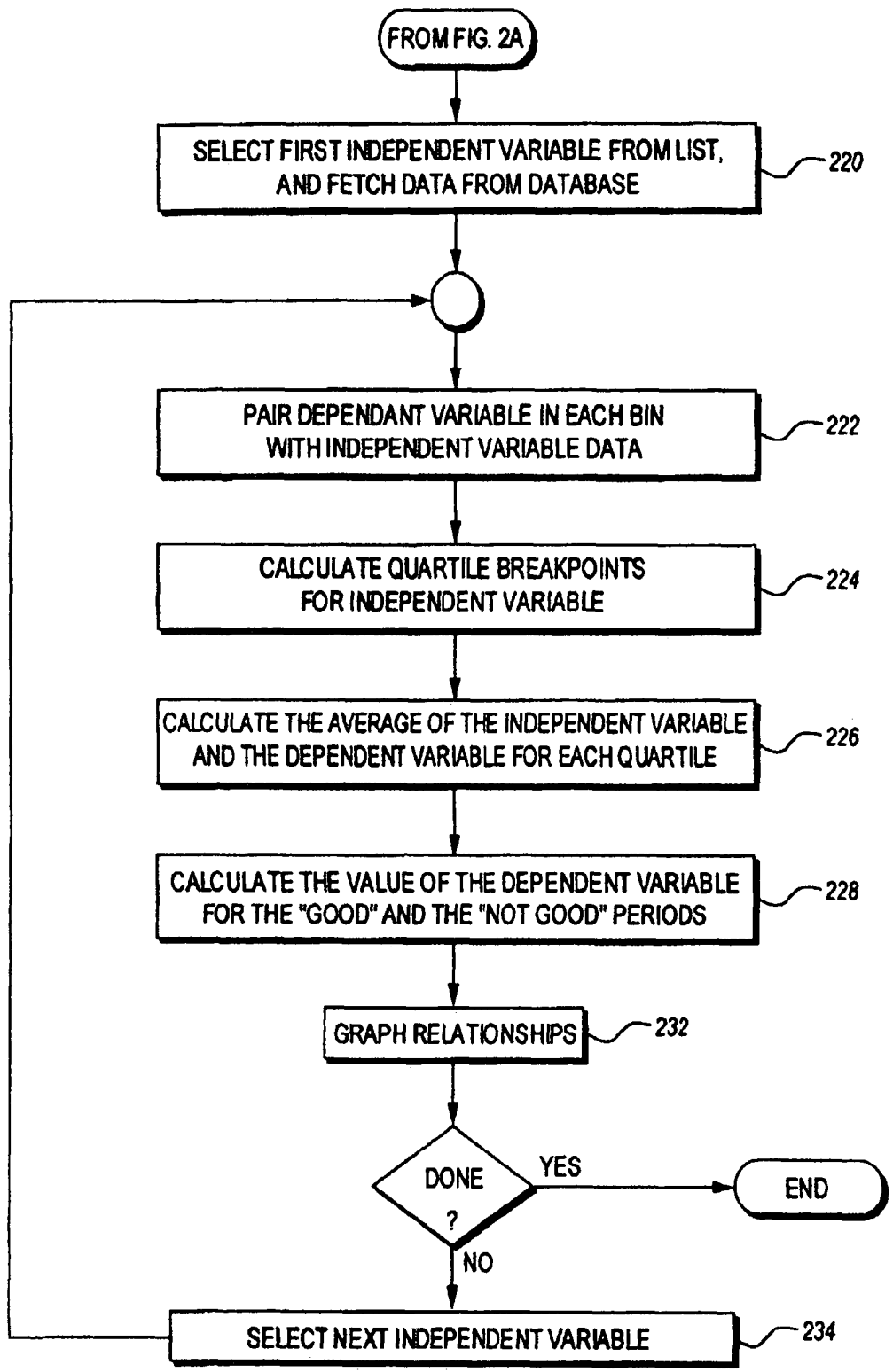
Figure 3A:
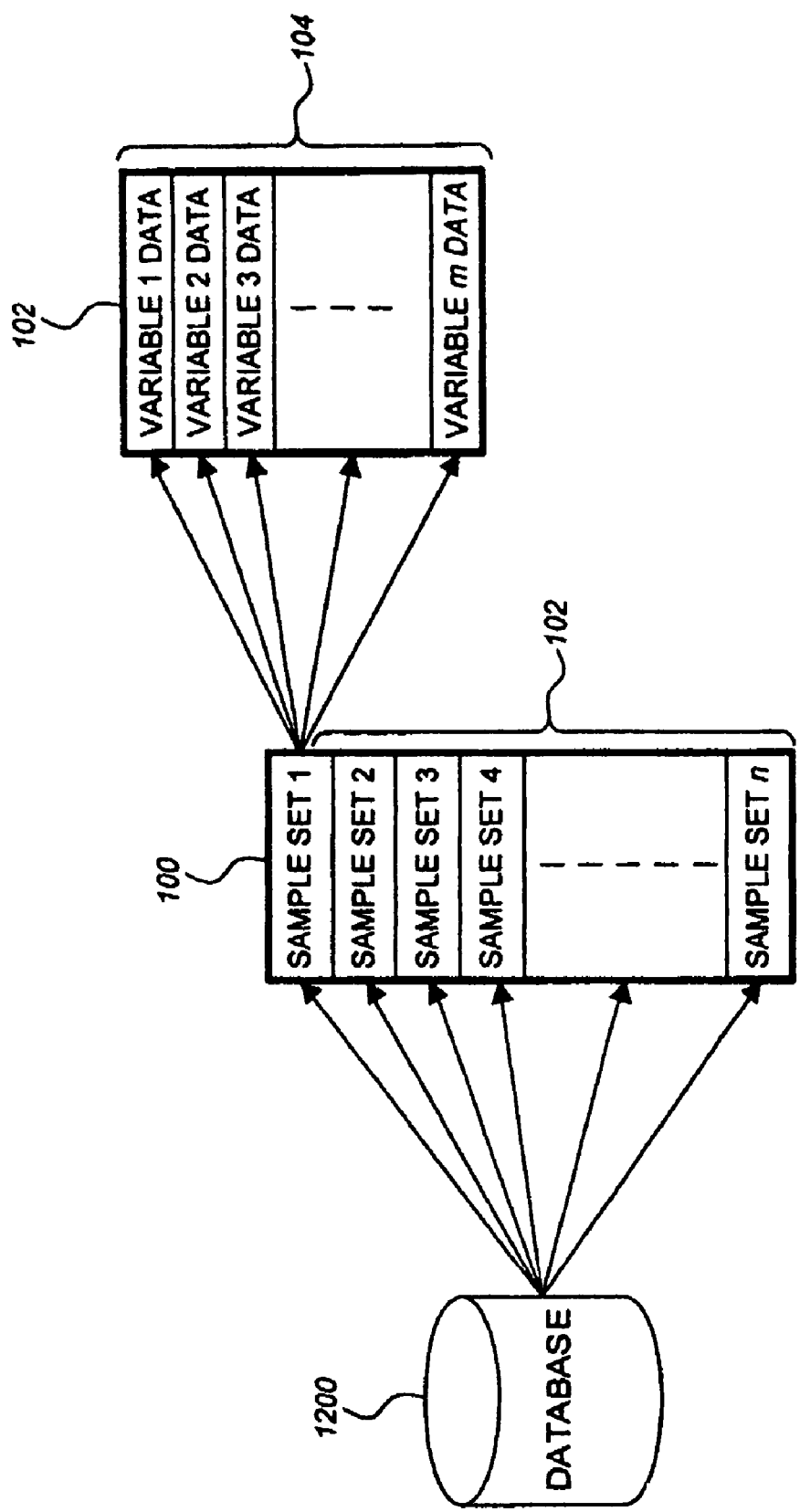
FIGS. 3A, 3B and 3C are block diagrams depicting a data transformation from raw historical data to filtered data organized into bins for analysis.
Figure 3B:
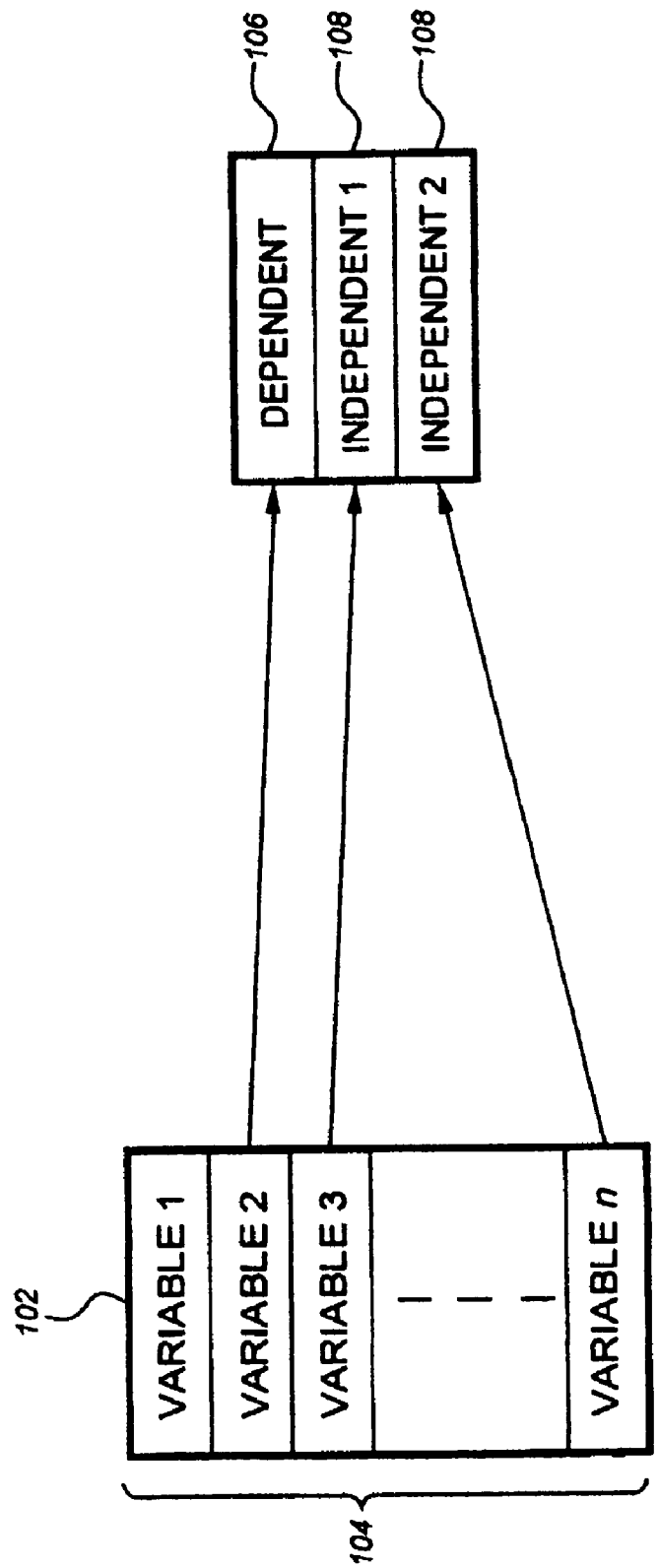
Figure 3C:
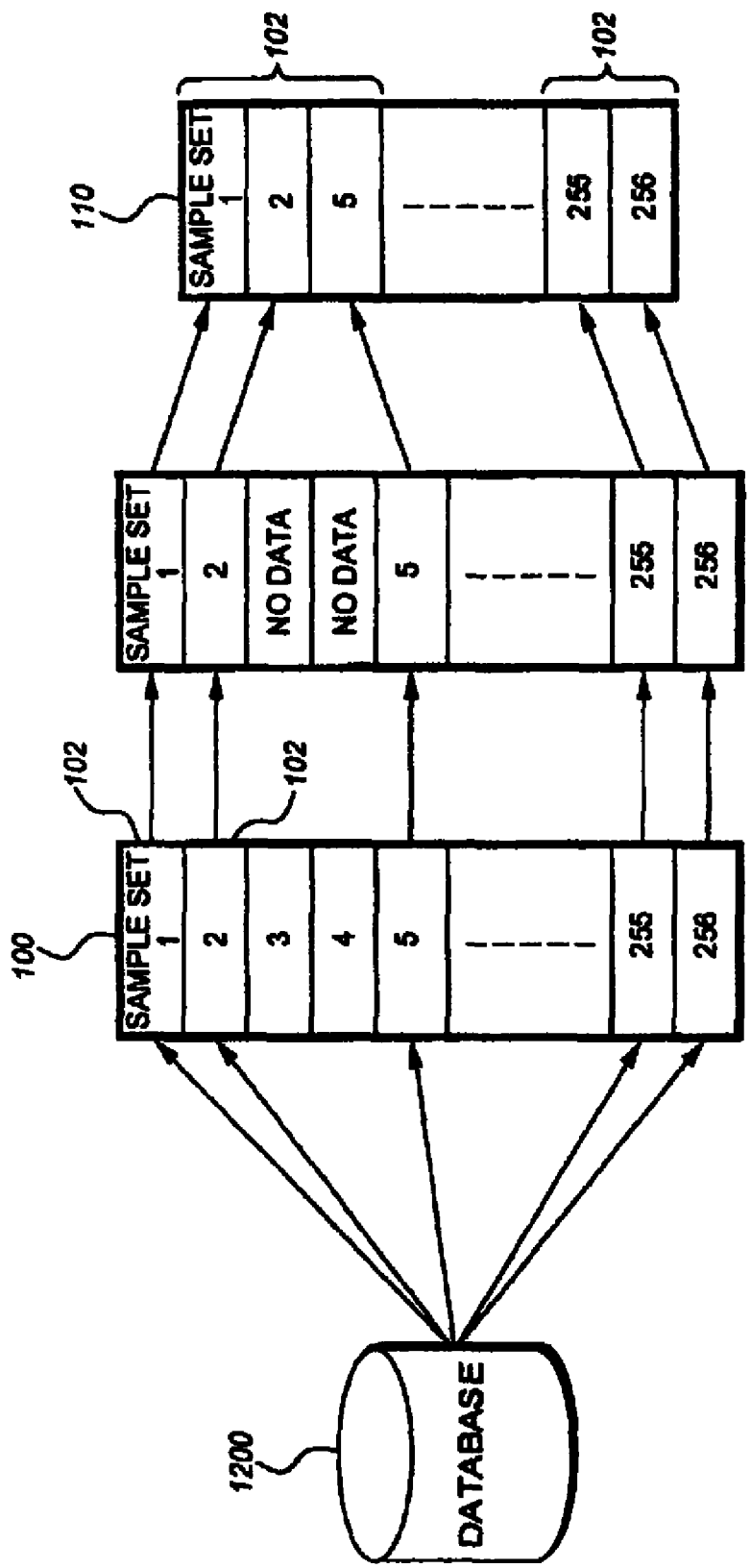

Turning now to FIGS. 2A and 2B, a flowchart illustrates the computerized method for data analysis is described in greater detail. Referring particularly to FIG. 2A along with FIGS. 3A, 3B, and 3C, the process begins, at step 200, with a series of steps wherein a user enters information relating generally to identifying the data to be analyzed, and the data is retrieved accordingly from the database 1200. The database 1200 contains data samples for a number of variables spanning a statistically useful historical time period. For the purposes of analysis, the data samples are organized into a raw collection 100 of sample sets or "bins" 102, each bin 102 being a uniform portion of the historical time period, such as a day or an hour. Within each bin 102 are data samples for several of the data variables 104. One of the data variables is designated as the dependent variable 106 (step 202), the dependent variable generally being a variable related to a particular fault condition, or a quality measure, production rate, speed, etc., within the manufacturing process 1000. At least one of the variables is designated as an independent variable 108. Constraints are identified for the dependent variable 106 and the independent variable 108, such as minimum or maximum values, or a range of data considered useful or desirable for a particular analysis (step 204).

Bins 102 are defined by setting the size and number of the bins desired for analysis. For example, each bin 102 might be defined to contain a day's worth of data samples, and two hundred and fifty six (256) bins 102 might be used (step 206). Also, a minimum number of samples may be specified for the bins 102. In addition to the bins 102, a time period may be identified to define a period of "good" process performance versus a period of "bad" process performance (step 208).

Once the bins 102 have been defined, data for the dependent variable 102 and the independent variable(s) are retrieved from the database for each of the bins 102 (step 214), according to the constraints that were defined by the user. Note that the dependent variable 106 might be represented within a bin 102 as a single data value (such as the count of an event occurring within the time frame of a bin 102), or as a number of data samples (such as a periodic sampling of a parameter within the time frame of a bin 102). If the dependent variable 106 is represented as a number of data samples, the average value for the number of data samples within a bin 102 is determined, along with a coefficient of variation, and recorded as the dependent variable value. As a result of the data constraints applied to the data retrieved from the database 1200, some of the bins 102 may have no data. Bins 102 with no data, or bins 102 that contain less than a specified minimum number of samples, are marked (step 216) and deleted (step 218). As an alternative, in addition to deleting the bins 102 that have been marked, new bins 102 may be identified within the database 1200 to replace the deleted bins, maintaining the desired number of bins 102. The result is a cleaned collection 110 of bins 102 that contain valid and relevant data for the dependent variable 106 and the independent variables 108.

Figure 4:
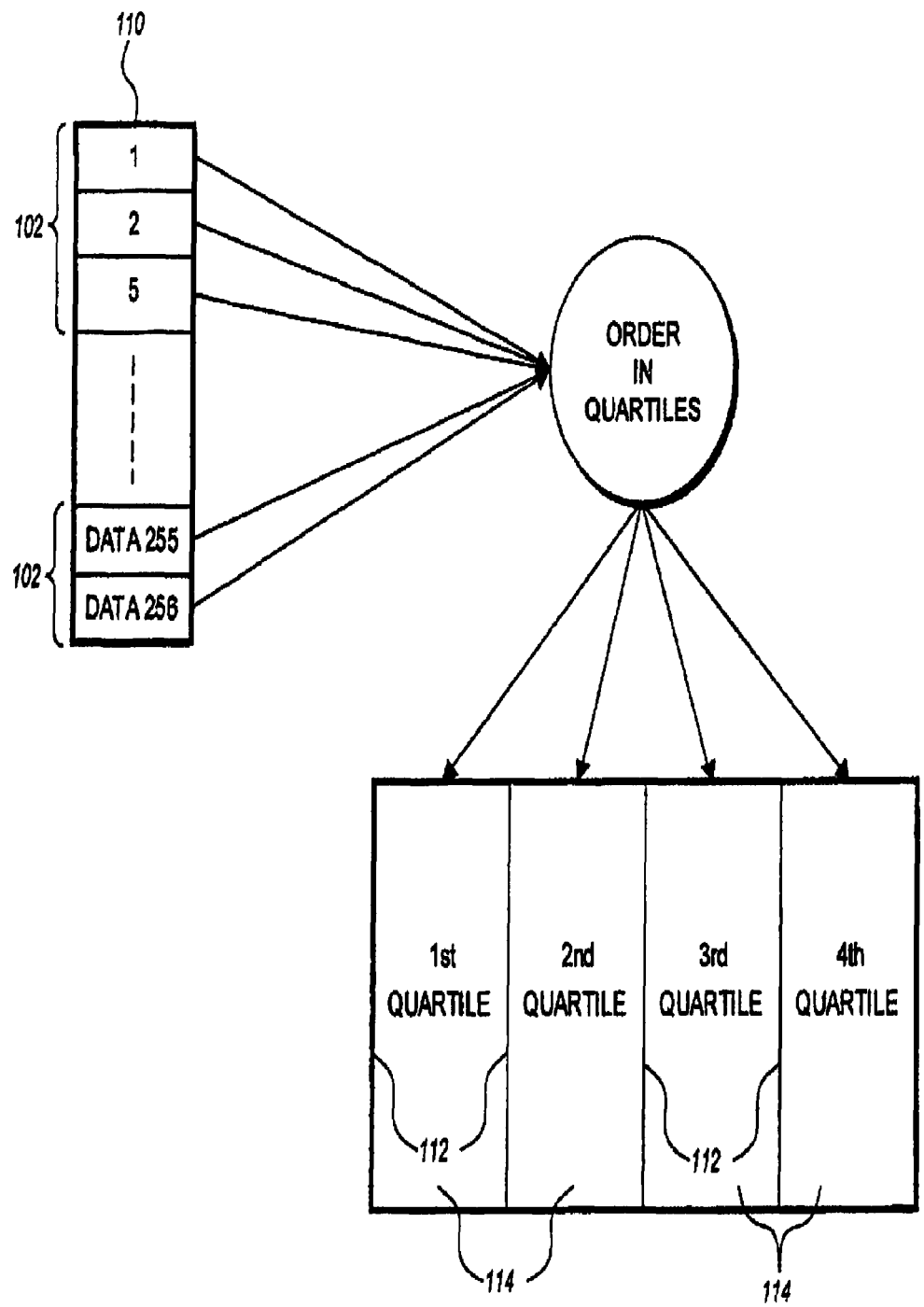
FIG. 4 is a block diagram depicting a data transformation from historical data organized in bins into a quartile distribution of the data.

Turning now to FIG. 2B, along with FIG. 4, the bins 102 are ranked according to an independent variable 108, and separated into a plurality of distribution sets 114, and a graph is produced to visually relate the dependent variable data to the independent variable data. The bins 102 may be ranked by the average value of the independent variable 108 within each bin, or by the coefficient of variation of the independent variable 108 data within the bins, or both. In the embodiment illustrated, the distribution sets 114 consist of four (4) quartile sets. This is repeated for each independent variable 108.

At step 220, a first independent variable is selected from a list of the independent variables identified previously at step 202. The bins 102 are then ordered into an ascending (or descending) series according to the independent variable data (step 222), using the average value or the coefficient of variation for each bin 102. The independent variable data is then used to calculate breakpoints 112 that divide the series of bins 102 into a plurality of distribution sets 114 (step 224). The distribution sets 114 may be determined to contain approximately the same number of bins 102, or may be determined by another criteria, such as a weighted distribution of the independent variable data. For each of the distribution sets 114, the average value of the independent variable 108 and the average value of the dependent variable 106 are determined (step 226). Additionally, a coefficient of variation may be determined for the independent variable 108 and for the dependent variable 106.

In addition to the distribution sets 114, data values or averages may be determined for the "good" and "not good" periods defined previously (step 228).

Figure 5:
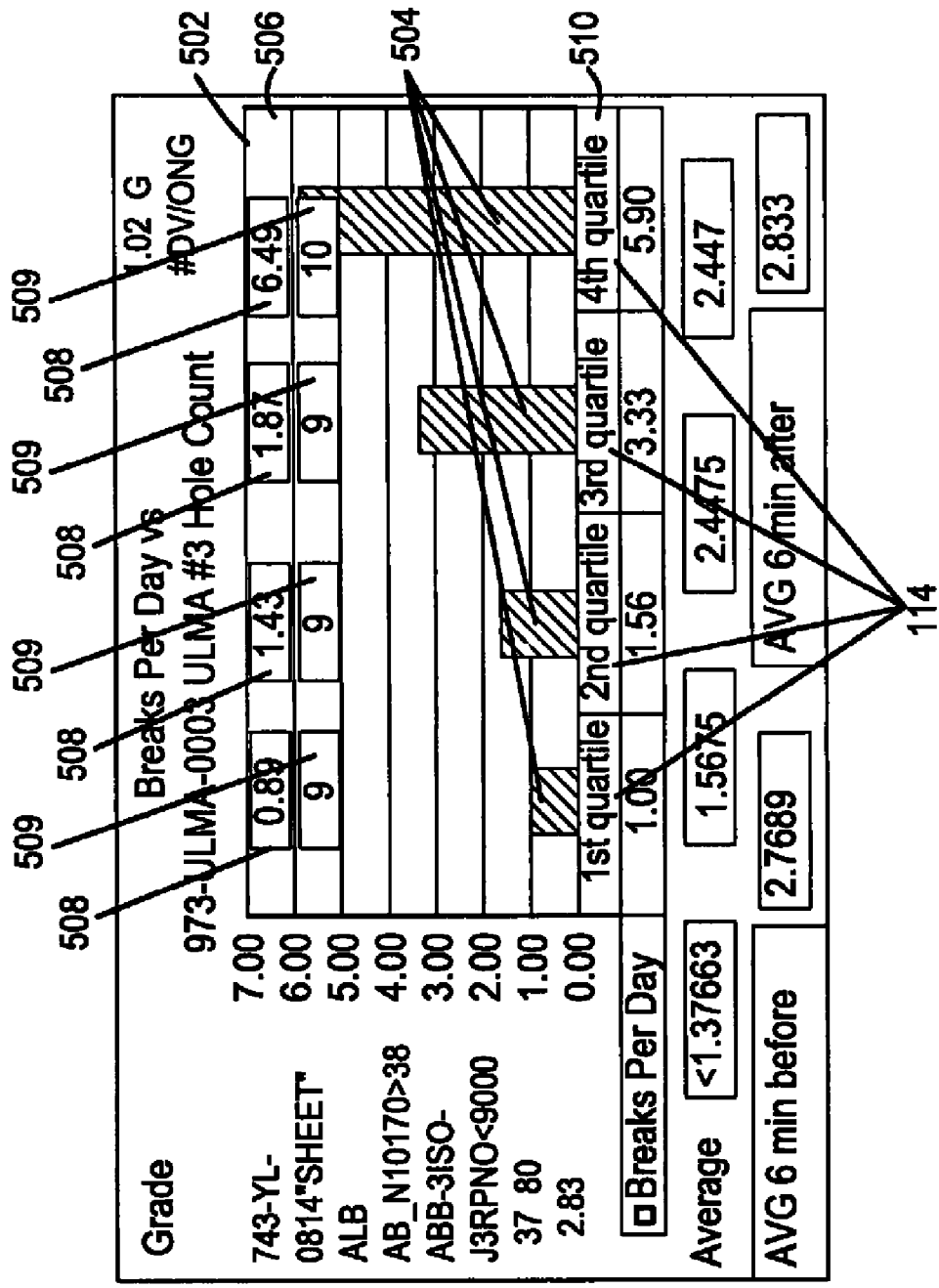
FIG. 5 is a screen shot illustrating a quartile distribution of an independent variable and its mapping to dependent variable data.

A graph is generated to visually associate the independent variable 108 and the dependent variable 106 average values. Referring to FIG. 5, a display image 500 is shown including a bar graph 502. The bar graph 502 includes a vertical bar 504 for each of the distribution sets 114, the vertical extent of each bar 504 indicating the average value for the dependent variable 106 within the associated distribution set 114. Along the top of the bar graph 502, an independent variable legend 506 displays the independent variable average value 508 for each of the distribution sets 114. A bin count legend 509 displays the number of bins 102 within each of the distribution sets 114. Note that a graph may be derived from either the average value or the coefficient of variation of the independent variable within each bin 102.

If additional independent variables 108 were identified, the next independent variable is selected (step 234) and the process repeated from step 222.

The bar graph 502 depicted in FIG. 5 shows a number of breaks per day in a paper manufacturing process verses a hole count, wherein breaks per day refers to breaks in the paper product web, while the hole count is a count of holes in the paper product web at a particular point in the paper manufacturing process. It can be recognized, by inspection of the bar graph 502, that there is a correlation between the breaks per day and the hole count. A fourth quartile 510 distribution set 114, which contains the highest independent variable values, also indicates the highest number of breaks per day.

Figure 6:
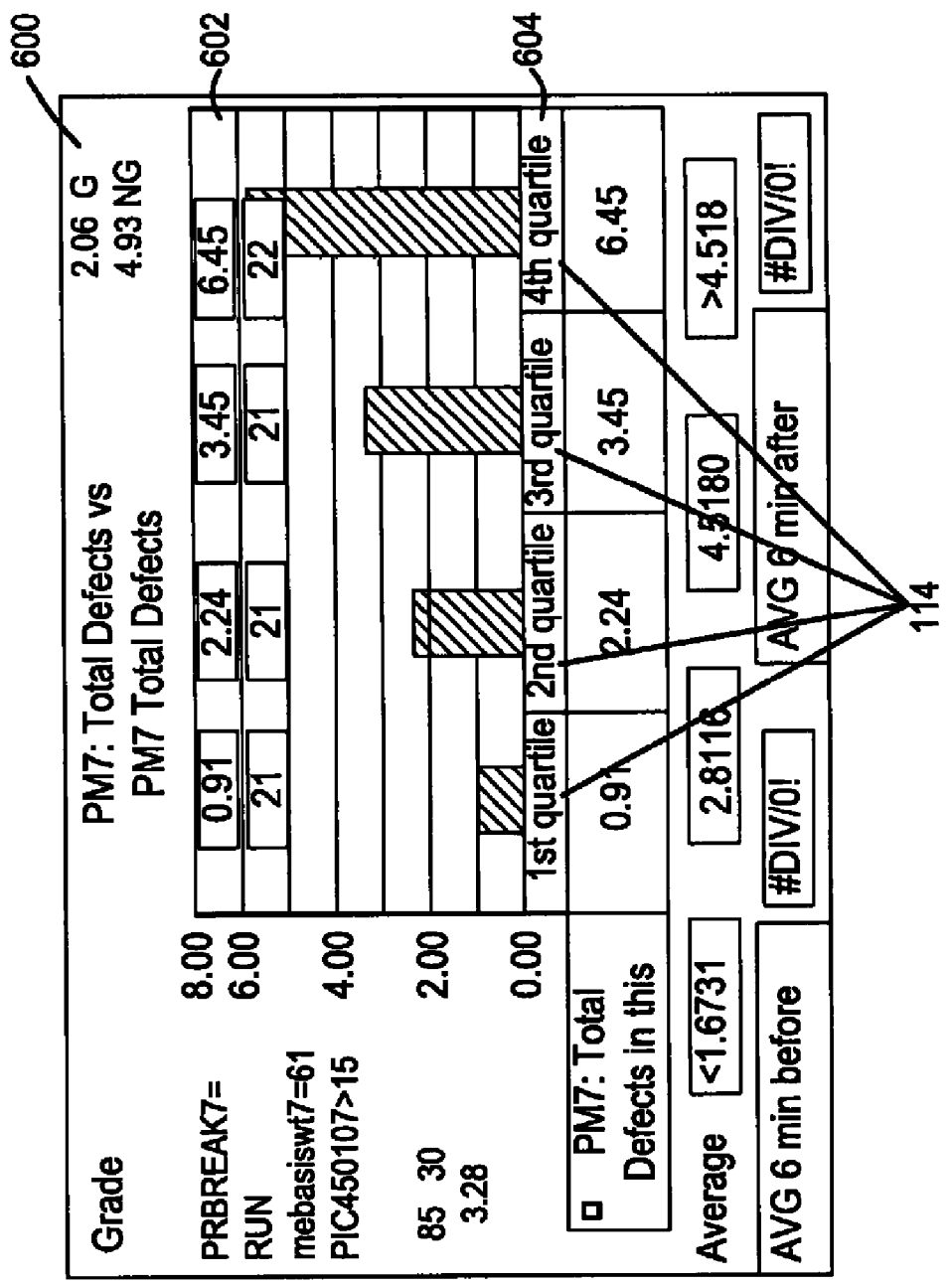
FIG. 6 is a screen shot illustrating the comparison of a dependent variable to itself to obtain a quartile distribution of the dependent variable.

Turning now to FIG. 6, a special case is illustrated wherein the same variable is selected as both the dependent variable 106 and the independent variable 108. The resulting display image 600 includes a bar graph 602 that depicts a distribution of the dependent variable across the quartile distribution sets 114. The bar graph 602 depicted in FIG. 6 ranks the variable "Total Defects" into quartile distribution sets 114. It is worth noting that this distribution identifies the "worst case" 604 among the distribution sets 114 for the dependent variable 106. Thus, it is useful to know that no other independent variable 108 can have a single distribution set 114 with a greater dependent variable 106 average value, unless the distribution set 114 based on a different independent variable 108 contains fewer bins 102.

It can be recognized that, once distribution sets 114 are determined for a given independent variable 108 and a given set of defined constraints, the distribution sets 114 and their associated average and coefficient of variation values for the independent variable do not change for subsequent analyzes utilizing different dependant variables 106, except for generally trivial changes that may result if, for example, pairings of independent variable 108 and dependent variable 106 samples result in slightly different distribution set 114 breakpoints. This allows for the comparison of multiple graphs, based on several dependent variables 106 each graphed against the same independent variable 108 distribution sets 114, to reveal causal relationships among the variables rather than a mere correlation.

Figure 7:
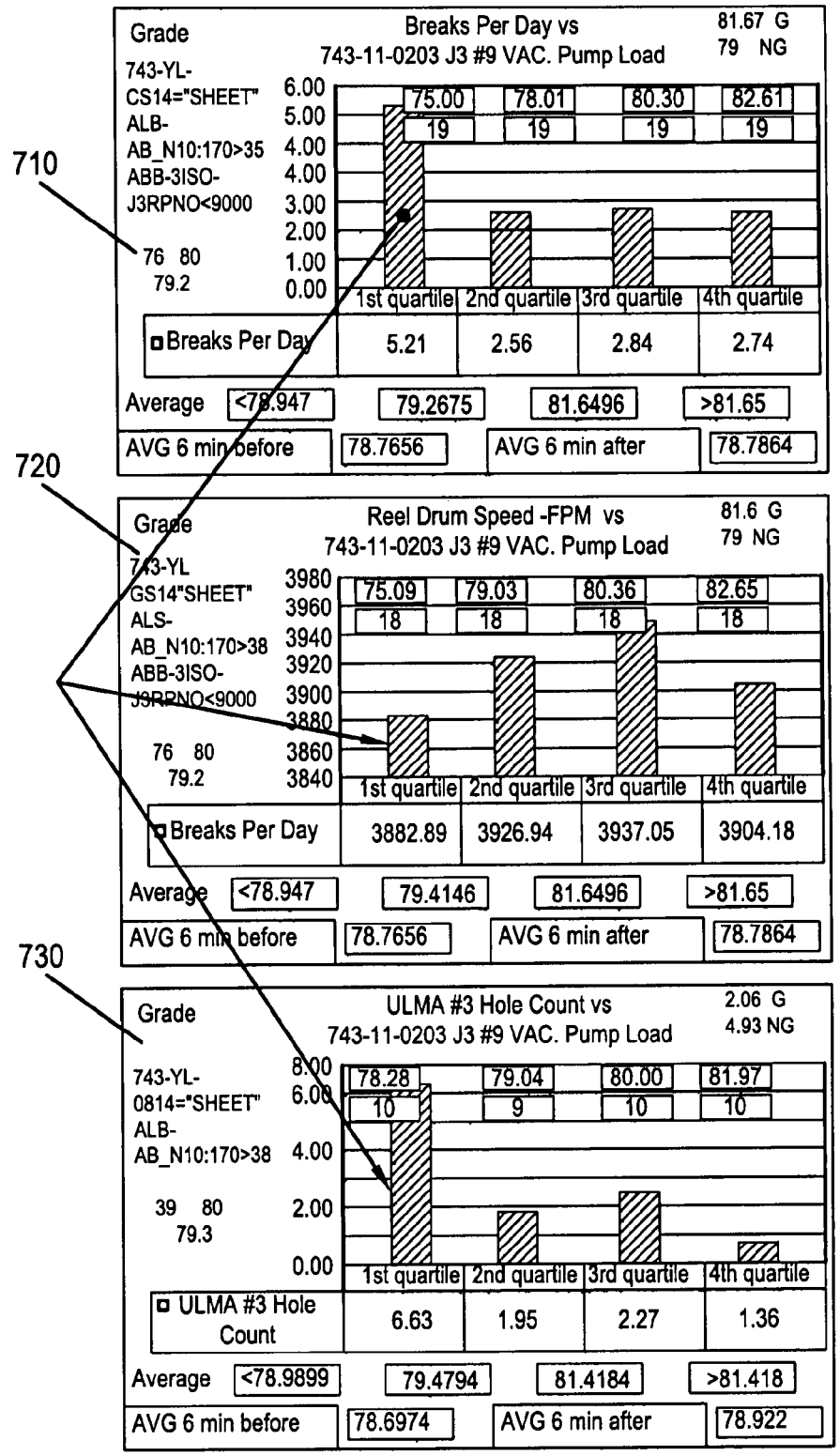
FIG. 7 illustrates the graphical relationship between multiple analyses showing a correlation between a dependent variable and at least one independent variable.
Figure 8:
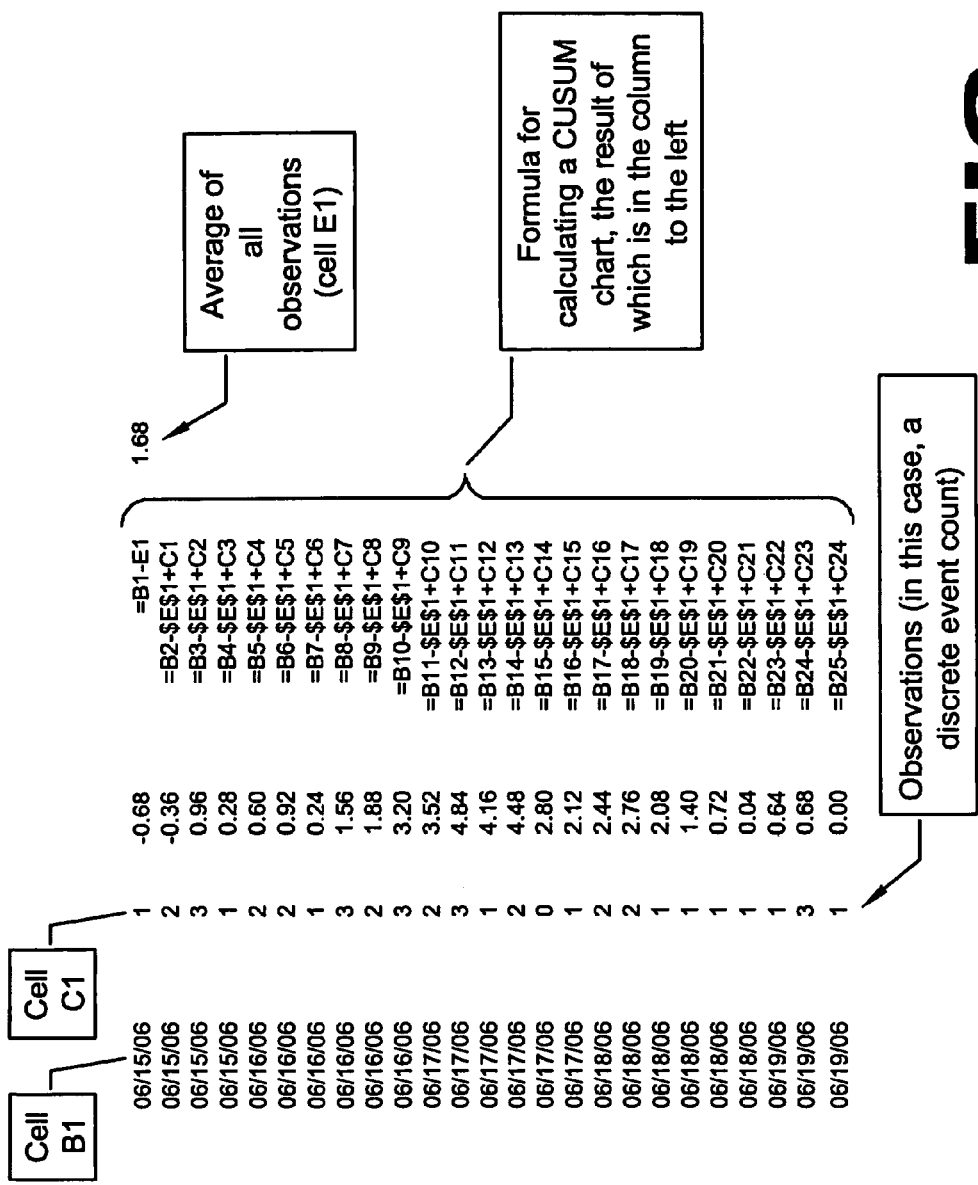
FIG. 8 illustrates an example of calculations for developing a CUSUM chart, as known in the prior art.
Figure 9:
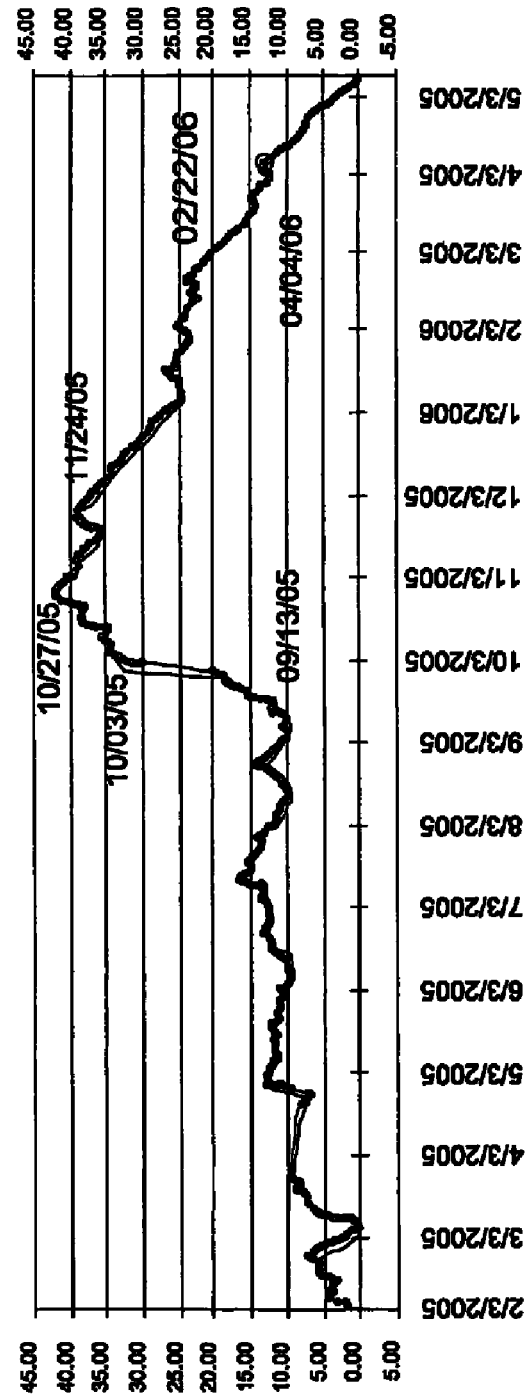
FIG. 9 illustrates is a CUSUM chart of hole counts on a paper machine, which graphically illustrates that hole counts peaked on Oct. 27, 2005, and have since been below average.

Turning to FIG. 7, it is shown that the computerized method for data analysis provides great insight into cause and effect relationships when multiple graphs are produced to discover relationships between multiple dependent variable 106 and independent variable 108 parings. In the example illustrated in FIG. 7, a paper manufacturing process for producing a manufactured paper web is analyzed to determine a cause of excessive paper breaks within the process in a day. Data collected from the paper manufacturing process includes the number of paper breaks per day, a measured vacuum pump load, a reel drum speed, and a count of holes found in the manufactured paper web (hole count). In each of three analyses, the measured vacuum pump load ("#9 VAC. PUMP LOAD") is used as the independent variable 108. In a first analysis, wherein the computerized method for data analysis results in graph 710, the number of paper breaks per day ("Breaks Per Day") is chosen as the dependent variable 106. The resulting graph 710 reveals that the breaks per day are correlated with a low vacuum pump load.

Additionally, in a second analysis, wherein the computerized method for data analysis results in graph 720, the reel drum speed ("Reel Drum Speed-FPM") is chosen as the dependent variable 106. The resulting graph 720 reveals that the real drum speed is also correlated with a low vacuum pump load. Finally, in a third analysis, wherein the computerized method for data analysis results in bar graph 730, the hole count ("#3 Hole Count") is chosen as the dependent variable 106. The resulting bar graph 730 reveals that the hole count too is correlated with a low vacuum pump load.

It follows that, while a comparison of breaks per day against reel drum speed and against hole count may indicate a correlation, the presentation of multiple analyses, effectively holding constant the independent variable across each analyses, reveals with a significant degree of confidence an actual causation of the paper breaks. More particularly, in this example, one proceeds to calculate the speed for the low vacuum pump load because paper breaks might have been caused by high speed; "freezing" the quartiles tells those skilled in the art that, in fact, the speed was the lowest in this quartile. Thus, high speed is not causing the breaks.

This method of "freezing the quartiles" also effectively identifies how human and control policies corrupt historical data. For example, if slow speed is associated with high break counts, it could be due to operators slowing down when they have problems. The fact that "slowing down" does not "fix" the problem tells one that taking action is not a "lever" with which to control breaks.

Thus, it can be seen that the computerized method for data analysis results in a graphical presentation of data gathered from a manufacturing process to reveal a causation of a fault condition, or a quality measure, production rate, speed, etc., within the manufacturing process.

The method of the present invention will be further explained by way of an example, in which a trial period for a manufacturing/production process is to start on September 12th and run for ten days through September 22nd. These are the "start" and "stop" dates of the trial period. The selected "time slice" is to be one day. The "filter criteria" could be any of one or more production variables, such as speed, product/grade, temperature, etc.

Figure 10A:
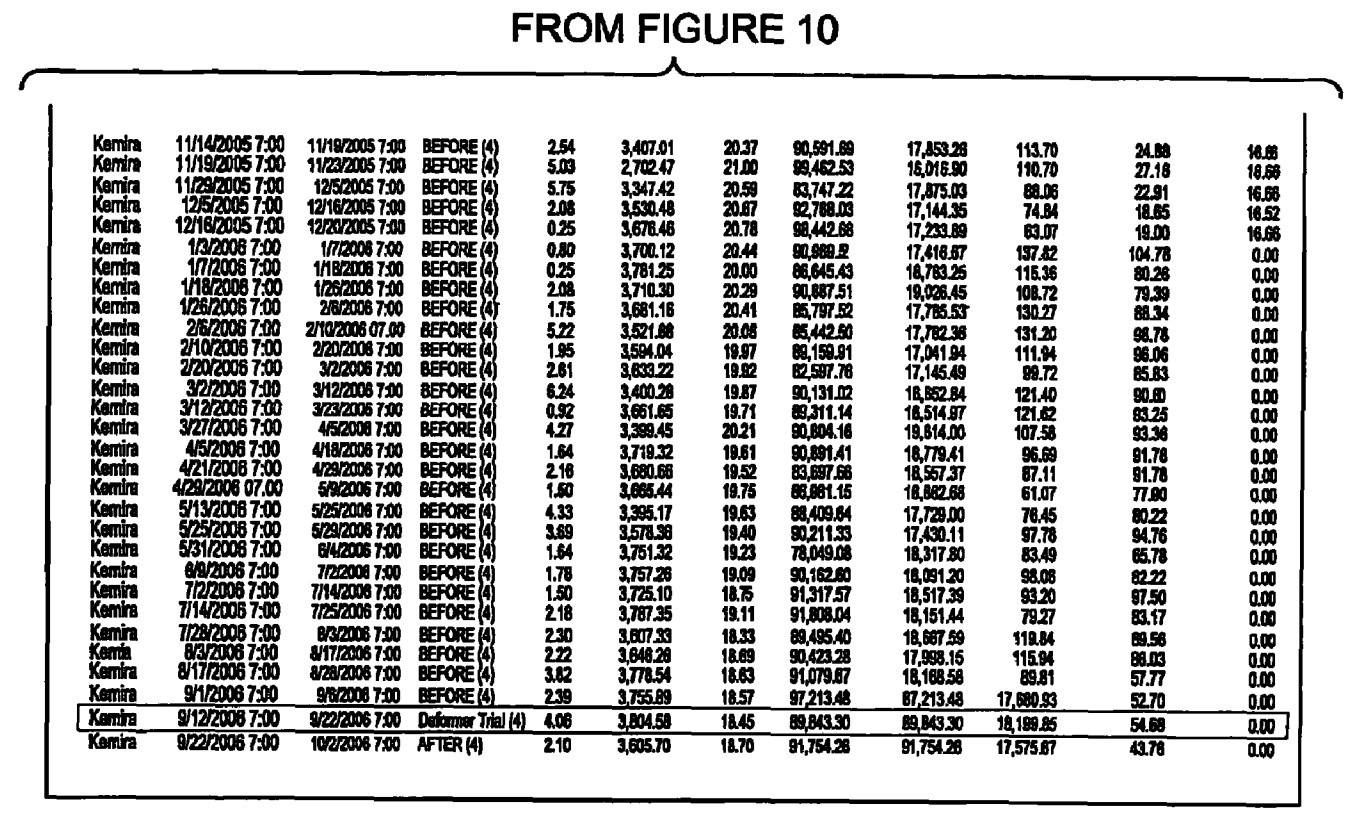

Empirical analysis in our example has determined that the filter criteria were met on each of September 13$^{rd}$; September 14$^{th}$; September 15$^{th}$; and September 18$^{th}$, and the data from these dates would be included in the "trial block." It should carefully be observed that there are only four "slice blocks" (or four days, since each time slice is one day in this example) included in the trial block, even though the trial period lasted a full ten days. This is because the other six days, or six other time slices, did not run under, or meet, the filter criteria, as defined by those persons analyzing the efficiency of a given manufacturing, or other industrial, process. The process then proceeds by grouping all other observed slices (there being 62 "other observed slices") into four slice blocks. The process continues by ranking the data measured during the trial period against the data observed in each of the other 62 slice blocks. A chart of what such a result might look like is seen in FIGS. 10 and 10A where FIG. 10A is a continuation of FIG. 10. The data in the box (one line from the bottom of the example) is the "trial block." The number "4" represents the number of slices in the block—since the trail is 4 slices of data, we group all slices into 4 slice blocks. Those blocks that occurred after the trial are labeled "after," while those blocks that occurred before the trial are labeled "before."

The trial block data (from FIG. 10A) in this example is summarized in FIG. 11. The first circle indicates that data obtained during the trial block had an average of 4.06 breaks per day (e.g., sheet breaks on a paper machine.) The second circle indicates that 89% of all other blocks had less breaks than this trial block. Since the object is fewer breaks—not more breaks—this result would mean that the trial was probably not successful. The 87% below the second circle indicates the statistical probability that the trial block was, indeed, different. The remainder of the columns compare other variables. For example, the second column indicates that 97% of all other blocks had a lower speed that the trial block—a potentially mitigating circumstances—as a well as a benefit.

Counting Discrete Events from a Data Array

Many industries use "data historians" to compile and store historical process and test data. These data historians allow users to filter data based upon speed, temperature, grade/product, etc. What the prior art fails to do is to provide a means for calculating discrete events based on conditional events using the stored history. These historians return data in arrays. Consider the array seen in FIG. 12. The present invention allows for the creation of a mathematical function that counts the first change in state from "good" to "bad." In the data array presented in FIG. 12, "0" is "bad" performance and "1" is good performance. The first column of dates, from 3:00 am on Jul. 28, 2006, until 7:00 pm on Jul. 28, 2006, had three of these "changes of state," which is shown in the shaded box. A user may also specify that a particular number of "good" observations be detected, after going from "good" to "bad" before another incident is counted. In the way, an aberration in one reading will not necessarily trigger a "change of state" determination. For example, in the above data array, if the minimum observations to "reset" the counter is 2, then the count in the first column would be 2, since the third "0" had only one "1" before it. This count, or detected "change of state," could also be based upon elapsed time. This means for creating a mathematical function that counts changes of state may be termed "ex post facto calculation" of a change of state that uses historical process data.

The invention also comprises a method that would involve the counting of breaks or discrete events based on the duration of the defect. For example, counting only those breaks that last at least 30 minutes. Or counting the breaks that are less than 40 minutes. Or counting the breaks that are more than 10 minutes, but less than 60 minutes. And, finally, not counting a new defect/break until the defect has been absent for at least 10 minutes Finally, a CUSUM chart, as well known to the skilled artisan, is a standard statistical method used to detect subtle, but significant, changes in a variable, as discussed earlier. When used to measure machine efficiency, or other parameter measuring performance of a machine or process, etc., a CUSUM charts shows precisely when performance changed. The CUSUM chart provided as an example in the "Background of the Invention" is a CUSUM chart for observing holes on a paper machine. The CUSUM chart shows that, on Sep. 13, 2005, the hole count went from average to well above average, as indicated by the line going upwardly at a steep angle. On Oct. 27, 2005, the hole count reversed and suddenly became lower than average. The "hole count" is shown in the CUSUM chart to have continued to be lower than average after Oct. 27, 2005, because the slope of the line shown is negative.

Figure 13:
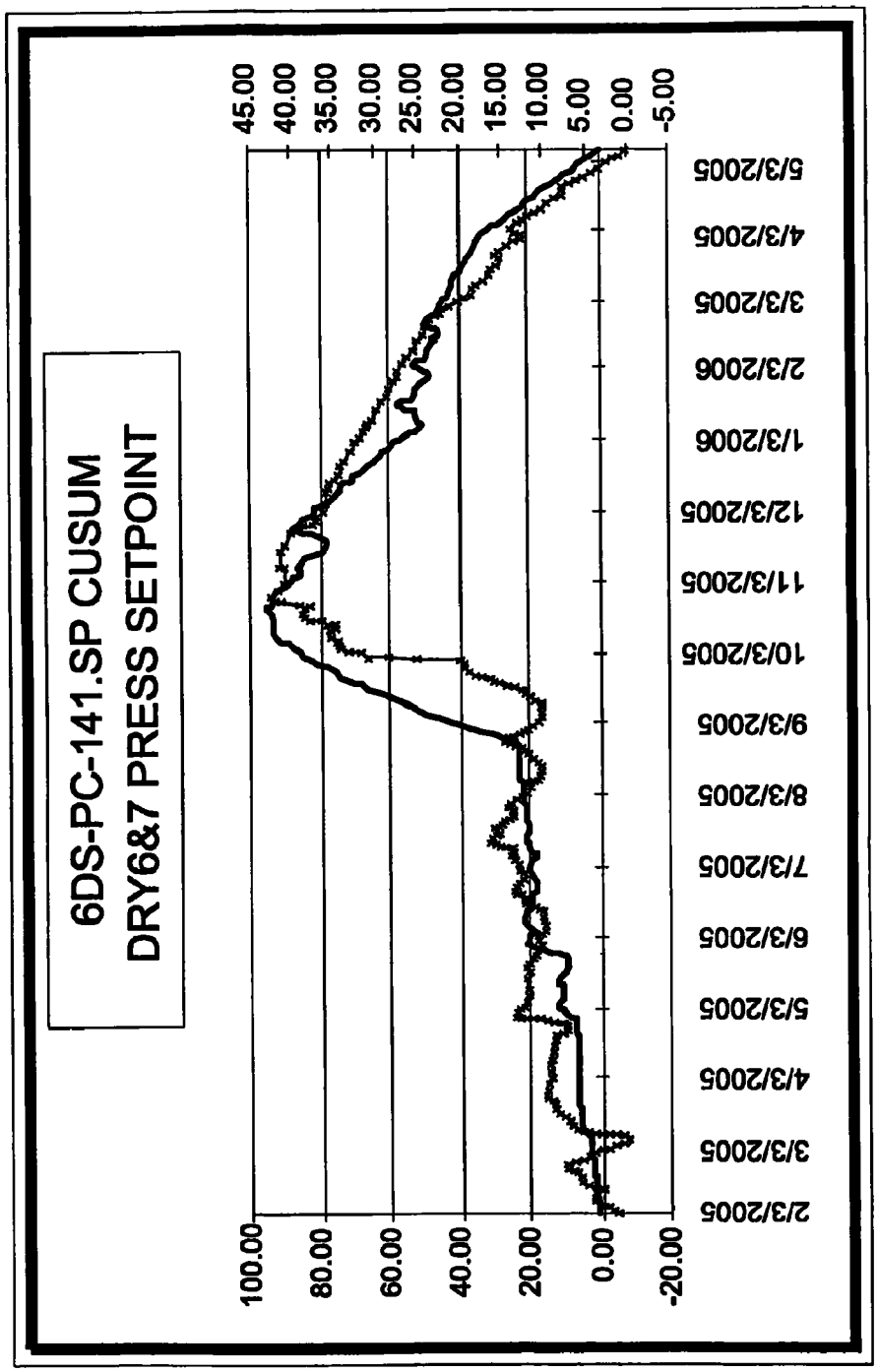
FIG. 13 illustrates an example of overlaying CUSUM charts.

By overlaying CUSUM charts, which may be developed according to the method of the present invention, correlation (if not necessarily causation) can be used to aid in identifying changes of state and, potentially, why sure changes in state occurred. Knowing, for example, that two particular parameters may have shown coincident changes may assist in determining causation. FIG. 13 is an example of overlaying CUSUM charts.

While only several embodiments of the present invention have been shown and described, it will be obvious to those skilled in the art that many modifications may be made to the present invention without departing from the spirit and scope thereof.

The invention claimed is:

1. A method for identifying one or more process state changes for a process, the method comprising:
   receiving an array of data from a data historian comprising data from a process including one or more dependent variables and one or more independent variables;
   defining a plurality of time slices or bins within the array of data with a predetermined time period using a microprocessor;
   counting a number of process state changes within each of the plurality of time slices or bins using a predetermined mathematical function and one or more values of one or more dependent variables or one or more values of one or more independent variables within each of the plurality of time slices or bins using a microprocessor and determining a number of sequential occurrences of a desired value of the one or more dependent variables or the one or more independent variables and counting a process state change only if the sequential number is greater or equal to a predetermined number of sequential occurrences; and
   returning the number of process state changes within each of the plurality of time slices or bins using a microprocessor.

2. The method of claim 1 further comprising returning one or more values of one or more independent variables or one or more values of one or more dependent variables within each of the plurality of time slices or bins.

3. The method of claim 1, further comprising selecting those time slices or bins where the number of process state changes is one of greater than, equal to, or less than a predetermined number of process state changes.

4. The method of claim 1, wherein counting the number of process state changes within each of the plurality of time slices or bins using the predetermined mathematical function and one or more values of one or more dependent variables or one or more values of one or more independent variables within each of the plurality of time slices or bins further comprises:
   comparing a duration of the one or more values of the one or more dependent variables or the one or more values of the one or more independent variables with a predetermined threshold and counting a process state change only if the duration is greater or equal to the predetermined threshold.

* * * * *